United States Patent
McLaughlin et al.

(10) Patent No.: US 12,025,754 B2
(45) Date of Patent: *Jul. 2, 2024

(54) ADAPTIVE WEIGHTING FOR ADAPTIVE ULTRASOUND IMAGING

(71) Applicant: Shenzhen Mindray Bio-Medical Electronics Co., Ltd., Shenzhen (CN)

(72) Inventors: Glen W. McLaughlin, San Carlos, CA (US); Albert Gee, Los Altos, CA (US); David J. Napolitano, Pleasanton, CA (US)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 394 days.

This patent is subject to a terminal disclaimer.

(21) Appl. No.: 17/406,502

(22) Filed: Aug. 19, 2021

(65) Prior Publication Data

US 2022/0043131 A1 Feb. 10, 2022

Related U.S. Application Data

(63) Continuation of application No. 16/156,761, filed on Oct. 10, 2018, now Pat. No. 11,125,867.

(51) Int. Cl.
*G01S 7/52* (2006.01)
*G01S 15/89* (2006.01)

(52) U.S. Cl.
CPC ...... *G01S 7/52047* (2013.01); *G01S 7/52095* (2013.01); *G01S 15/8997* (2013.01)

(58) Field of Classification Search
None
See application file for complete search history.

(56) References Cited

U.S. PATENT DOCUMENTS

| | | | |
|---|---|---|---|
| 4,855,911 A | 8/1989 | Lele | |
| 5,453,575 A | 9/1995 | O'Donnell | |
| 5,551,433 A | 9/1996 | Wright | |
| 5,799,111 A | 8/1998 | Guissin | |

(Continued)

FOREIGN PATENT DOCUMENTS

| | | | |
|---|---|---|---|
| CN | 102895000 A | | 1/2013 |
| CN | 103536316 A | * | 1/2014 |

(Continued)

*Primary Examiner* — Hovhannes Baghdasaryan
(74) *Attorney, Agent, or Firm* — Kory D. Christensen

(57) ABSTRACT

Systems and methods are disclosed for performing ultrasound imaging. Channel domain data can be received from an ultrasound transducer to form one or more channel domain data sets. A first ultrasound processing operation can be applied to the channel domain data to generate a first subset of one or more images from the one or more channel domain data sets. A second ultrasound processing operation can be applied to the channel domain data to generate a second subset of one or more images from the one or more channel domain data sets. Image characteristics of the first subset of one or more images and the second subset of one or more images can be regionally analyzed to identify regional image characteristics of the first and second subsets of one or more images. The first subset of one or more images can be blended with the second subset of one or more images based on the regional image characteristics to generate one or more composite images.

12 Claims, 7 Drawing Sheets

(56) References Cited

U.S. PATENT DOCUMENTS

| | | | |
|---|---|---|---|
| 5,961,460 A | 10/1999 | Guracar | |
| 5,961,462 A | 10/1999 | Loupas | |
| 6,048,316 A | 4/2000 | Zhao | |
| 6,179,781 B1 * | 1/2001 | Phillips | G01S 15/8979 600/454 |
| 8,115,934 B2 | 2/2012 | Boppart | |
| 2005/0124884 A1 | 6/2005 | Bolorforosh | |
| 2005/0215893 A1 | 9/2005 | Barnes | |
| 2006/0173313 A1 * | 8/2006 | Liu | G01S 15/8993 600/437 |
| 2009/0306512 A1 | 12/2009 | Loftman et al. | |
| 2012/0289835 A1 | 11/2012 | Hwang | |
| 2013/0102830 A1 | 4/2013 | Otto | |
| 2013/0109971 A1 | 5/2013 | Dahl | |
| 2013/0144165 A1 | 6/2013 | Ebbini | |
| 2014/0276046 A1 | 9/2014 | Kim | |
| 2015/0320396 A1 * | 11/2015 | Abe | G01S 7/52077 600/443 |
| 2015/0359512 A1 | 12/2015 | Boctor | |
| 2017/0053396 A1 | 2/2017 | Zhai | |

FOREIGN PATENT DOCUMENTS

| | | |
|---|---|---|
| CN | 104042247 A | 9/2014 |
| CN | 107789008 A | 3/2018 |

\* cited by examiner

ADAPTIVE WEIGHTING FOR ADAPTIVE ULTRASOUND IMAGING

CROSS-REFERENCE TO RELATED APPLICATIONS

This is a continuation of U.S. patent application Ser. No. 16/156,761, filed Oct. 10, 2018, for ADAPTIVE WEIGHTING FOR ADAPTIVE ULTRASOUND IMAGING, which is incorporated herein by reference.

TECHNICAL FIELD

This disclosure relates to ultrasound imaging. Specifically, this disclosure relates to applying different ultrasound processing operations to channel domain data forming one or more channel domain data sets as part of performing adaptive weighting for adaptive ultrasound imaging.

BACKGROUND OF THE INVENTION

Ultrasound imaging is a technology that usually requires the user to make performance tradeoffs in-order to optimize one aspect of an image at the expense of another. Specifically, a single setting or ultrasound processing operation does not produce optimal imaging performance in the entire image field of view. In turn, this leads to longer examination times and greater numbers of failed or otherwise inconclusive examinations using ultrasound. There therefore exist needs for systems and methods that allow for application of different imaging strategies and ultrasound processing operations in order to process the ultrasound data optimally, for a given ultrasound application.

Specifically, over the years that ultrasound imaging has been used for the diagnosis of soft tissue structures, several technologies have been created to help improve the imaging performance. Some of these technologies include harmonic imaging, spatial compounding, harmonic/fundamental compounding, coherent beamforming, zone sonography, and the like. Each of these technologies has improved at least a single aspect of imaging performance. For example, these technologies have led to improvements in one of detail resolution, lower clutter, contrast resolution, higher temporal resolution, and the like. However, while each of these technologies provide improvements to aspects of ultrasound imaging, such improvements are achieved at times at the detriment of another aspect of the imaging. There therefore exist needs for systems and methods that allow for application of multiple ultrasound processing operations to channel domain data, e.g. as part of reprocessing this data under a variety of different conditions, to extract additional information for improving performance in ultrasound imaging. More specifically, there exist needs for systems and methods that apply multiple ultrasound processing operations to channel domain data while lowering the number of transmit/receive cycles needed to improve the performance in ultrasound imaging.

Further, ultrasound systems work in a feedforward method. Specifically, data is typically processed and then discarded making it impossible to process a single set of data under various image formation schemes and different ultrasound processing operations in different image formation schemes. As discussed previously, each image formation scheme usually has various performance tradeoffs or limitations so that a single ideal processing method is not applicable for all the various areas being imaged. This is especially true with synthetic aperture image formation methods as the processing algorithms tend to be focused on optimizing a single image attribute at the detriment of the other attributes or when set to an overall balance of the parameters. Accordingly, a resulting image is a compromise of the desired image attributes of detail resolution, contrast resolution, penetration, and temporal resolution. There therefore, exist needs for systems and methods that allow for data to be processed as part of ultrasound imaging multiple times and potentially using different ultrasound processing operations.

Specifically, traditional ultrasound systems have not been capable of reprocessing the channel domain data sets multiple times. For example, in a standard coherent beamformer system, the channel domain data is passed to the coherent beamformer on each transmit/receive cycle and once the data has been passed to the coherent beamformer, the data is discarded from the channel domain data set. As such, the channel domain data set in traditional ultrasound systems is stored as First In First Out (FIFO) memory rather than in a buffer. Subsequently, once the coherent beamformer has performed the appropriate delay, apodization, phase rotation and sum to the data, the data is than passed to the backend processing systems. The coherent beamformer does extract at least two vectors of information from each transmit/receive cycle data set and in the backend processing unit the vectors that are spatially coincident from different transmit/receive cycles are coherently added in a weighted manner to improve signal to noise as well as the point spread function characteristics. After the coherent beamformer processes the data, the image data goes through various additional processing that can include upsampling, filtering downsampling, scaling, detection, log compression and the like. At this point the image data is than displayed to the user. Once again, only a single ultrasound processing operation or image formation scheme is applied through the coherent beamformer. This is problematic, as only a single image attribute or group of specific attributes is enhanced or otherwise optimized for creating an image, at the detriment of the other attributes or when set to an overall balance of the parameters. There therefore, exist needs for systems and methods that allow for data to be processed as part of ultrasound imaging multiple times and potentially using different ultrasound processing operations.

SUMMARY

According to various embodiments, channel domain data is received from an ultrasound transducer to form one or more channel domain data sets. A first ultrasound processing operation can be applied to at least a portion of the channel domain data to generate a first subset of one or more images from the one or more channel domain data sets. Further, a second ultrasound processing operation can be applied to at least a portion of the channel domain data to generate a second subset of one or more images from the one or more channel domain data sets. Image characteristics of the first subset of one or more images and the second subset of one or more images can be regionally analyzed to identify regional image characteristics of the first subset of one or more images and regional image characteristics of the second subset of one or more images. The first subset of one or more images and the second subset of one or more images can be blended based on the regional image characteristics of the first subset of one or more images and the regional image characteristics of the second subset of one or more images. Specifically, the first and second subsets of one or more images can be blended based on the regional image characteristics to generate one or more composite images from the one or more channel domain data sets. The one or more composite images can be subsequently displayed to a user of an ultrasound system, e.g. after post processing.

In various embodiments, channel domain data is received from an ultrasound transducer to form one or more channel domain data sets. A first ultrasound processing operation can be applied to at least a portion of the channel domain data to generate a first subset of one or more images from the one or more channel domain data sets. Further, a second ultrasound processing operation can be applied to at least a portion of the channel domain data to generate a second subset of one or more images from the one or more channel domain data sets. The first subset of one or more images and the second subset of one or more images can be blended to generate one or more composite images from the one or more channel domain data sets. The one or more composite images can be subsequently displayed to a user of an ultrasound system, e.g. after post processing.

In certain embodiments, a system includes a processor and a computer-readable medium providing instructions accessible to the processor to cause the processor to perform operations including receiving, from an ultrasound transducer, channel domain data to form one or more channel domain data sets. The instructions can further cause the processor to apply a first ultrasound processing operation to at least a portion of the channel domain data to generate a first subset of one or more images from the one or more channel domain data sets. Additionally, the instructions can cause the processor to apply a second ultrasound processing operation to at least a portion of the channel domain data to generate a second subset of one or more images from the one or more channel domain data sets. The instructions can cause the processor to regionally analyze image characteristics of the first subset of one or more images and the second subset of one or more images to identify regional image characteristics of the first subset of one or more images and regional image characteristics of the second subset of one or more images. Further, the instructions can cause the processor to blend the first subset of one or more images with the second subset of one or more images based on the regional image characteristics of the first subset of one or more images and the second subset of one or more images to generate one or more composite images from the one or more channel domain data sets. The instructions can also cause the processor to display the one or more composite images to a user, e.g. after post processing.

DETAILED DESCRIPTION

Figure 1:
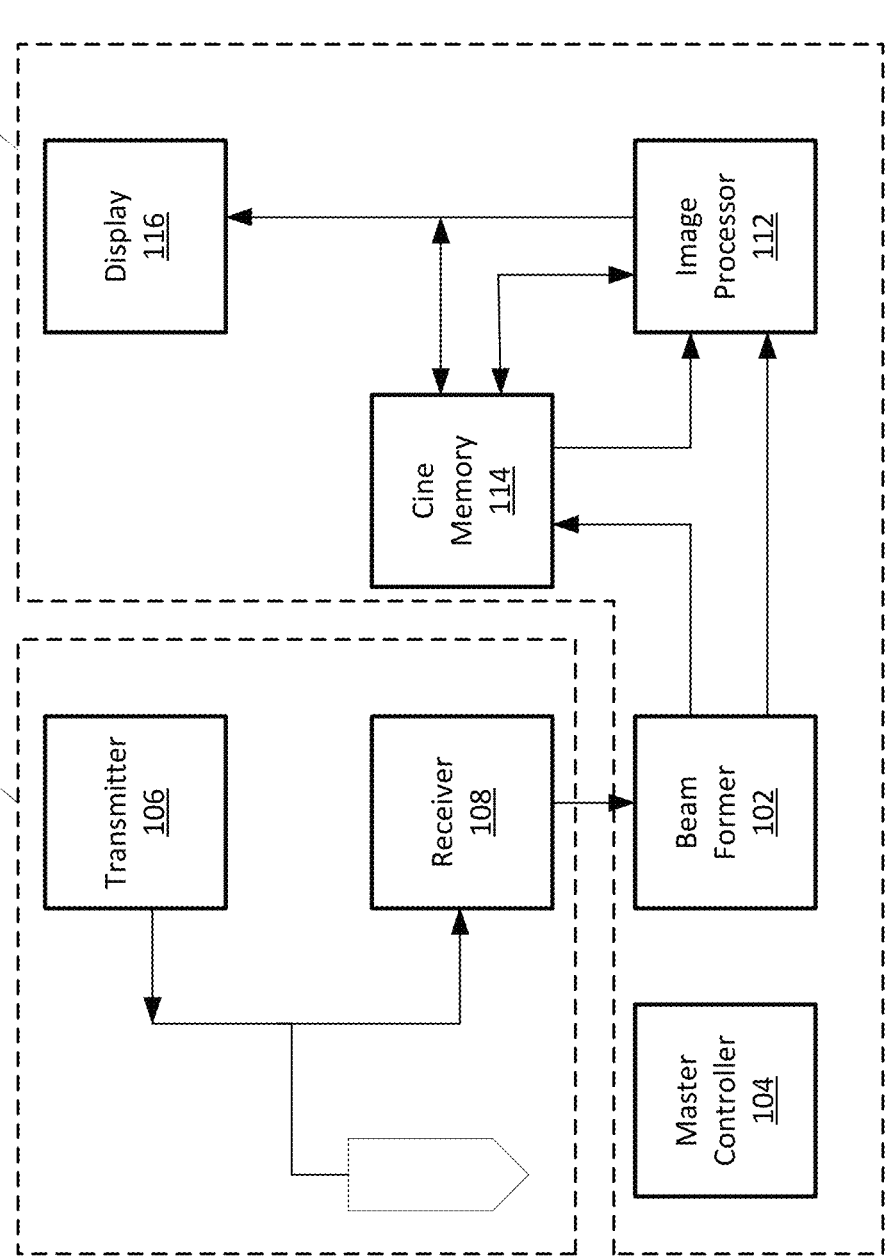
FIG. 1 illustrates an example of an ultrasound system.

According to various embodiments, channel domain data is received from an ultrasound transducer to form one or more channel domain data sets. A first ultrasound processing operation can be applied to at least a portion of the channel domain data to generate a first subset of one or more images from the one or more channel domain data sets. Further, a second ultrasound processing operation can be applied to at least a portion of the channel domain data to generate a second subset of one or more images from the one or more channel domain data sets. Image characteristics of the first subset of one or more images and the second subset of one or more images can be regionally analyzed to identify regional image characteristics of the first subset of one or more images and regional image characteristics of the second subset of one or more images. The first subset of one or more images and the second subset of one or more images can be blended based on the regional image characteristics of the first subset of one or more images and the regional image characteristics of the second subset of one or more images. Specifically, the first and second subsets of one or more images can be blended based on the regional image characteristics to generate one or more composite images from the one or more channel domain data sets. The one or more composite images can be subsequently displayed to a user of an ultrasound system, e.g. after post processing.

In various embodiments, channel domain data is received from an ultrasound transducer to form one or more channel domain data sets. A first ultrasound processing operation can be applied to at least a portion of the channel domain data to generate a first subset of one or more images from the one or more channel domain data sets. Further, a second ultrasound processing operation can be applied to at least a portion of the channel domain data to generate a second subset of one or more images from the one or more channel domain data sets. The first subset of one or more images and the second subset of one or more images can be blended to generate one or more composite images from the one or more channel domain data sets. The one or more composite images can be subsequently displayed to a user of an ultrasound system, e.g. after post processing.

In certain embodiments, a system includes a processor and a computer-readable medium providing instructions accessible to the processor to cause the processor to perform operations including receiving, from an ultrasound transducer, channel domain data to form one or more channel domain data sets. The instructions can further cause the processor to apply a first ultrasound processing operation to at least a portion of the channel domain data to generate a first subset of one or more images from the one or more channel domain data sets. Additionally, the instructions can cause the processor to apply a second ultrasound processing operation to at least a portion of the channel domain data to generate a second subset of one or more images from the one or more channel domain data sets. The instructions can cause the processor to regionally analyze image characteristics of the first subset of one or more images and the second subset of one or more images to identify regional image characteristics of the first subset of one or more images and regional image characteristics of the second subset of one or more images. Further, the instructions can cause the processor to blend the first subset of one or more images with the second subset of one or more images based on the regional image characteristics of the first subset of one or more images and the second subset of one or more images to generate one or more composite images from the one or more channel domain data sets. The instructions can also cause the processor to display the one or more composite images to a user, e.g. after post processing.

Some of the infrastructure that can be used with embodiments disclosed herein is already available, such as general-purpose computers, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example of an ultrasound system 100. The ultrasound system 100 shown in FIG. 1 is merely an example system and in various embodiments, the ultrasound system 100 can have less components or additional components. The ultrasound system 100 can be an ultrasound system where the receive array focusing unit is referred to as a beam former 102, and image formation can be performed on a scanline-by-scanline basis. System control can be centered in the master controller 104, which accepts operator inputs through an operator interface and in turn controls the various subsystems. For each scan line, the transmitter 106 generates a radio-frequency (RF) excitation voltage pulse waveform and applies it with appropriate timing across the transmit aperture (defined by a sub-array of active elements) to generate a focused acoustic beam along the scan line. RF echoes received by the receive aperture 108 of the transducer 110 are amplified and filtered by the receiver 108, and then fed into the beam former 102, whose function is to perform dynamic receive focusing; i.e., to re-align the RF signals that originate from the same locations along various scan lines.

The image processor 112 can perform processing specific to active imaging mode(s) including 2D scan conversion that transforms the image data from an acoustic line grid to an X-Y pixel image for display. For Spectral Doppler mode, the image processor 112 can perform wall filtering followed by spectral analysis of Doppler-shifted signal samples using typically a sliding FFT-window. The image processor 112 can also generate the stereo audio signal output corresponding to forward and reverse flow signals. In cooperation with the master controller 104, the image processor 112 also can format images from two or more active imaging modes, including display annotation, graphics overlays and replay of cine loops and recorded timeline data.

The cine buffer 114 provides resident digital image storage for single image or multiple image loop review, and acts as a buffer for transfer of images to digital archival devices. On most systems, the video images at the end of the data processing path can be stored to the cine memory. In state-of-the-art systems, amplitude-detected, beamformed data may also be stored in cine memory 114. For spectral Doppler, wall-filtered, baseband Doppler I/Q data for a user-selected range gate can be stored in cine memory 114. Subsequently, the display 11 can display ultrasound images created by the image processor 112 and/or images using data stored in the cine memory 114.

The beam former 102, the master controller 104, the image processor, the cine memory 114, and the display can be included as part of a main processing console 118 of the ultrasound system 100. In various embodiments, the main processing console 118 can include more or fewer components or subsystems. The ultrasound transducer 110 can be incorporated in an apparatus that is separate from the man processing console 118, e.g. in a separate apparatus that is wired or wirelessly connected to the main processing console 118. This allows for easier manipulation of the ultrasound transducer 110 when performing specific ultrasound procedures on a patient. Further, the transducer 110 can be an array transducer that includes an array of transmitting and receiving elements for transmitting and receiving ultrasound waves.

Figure 2:
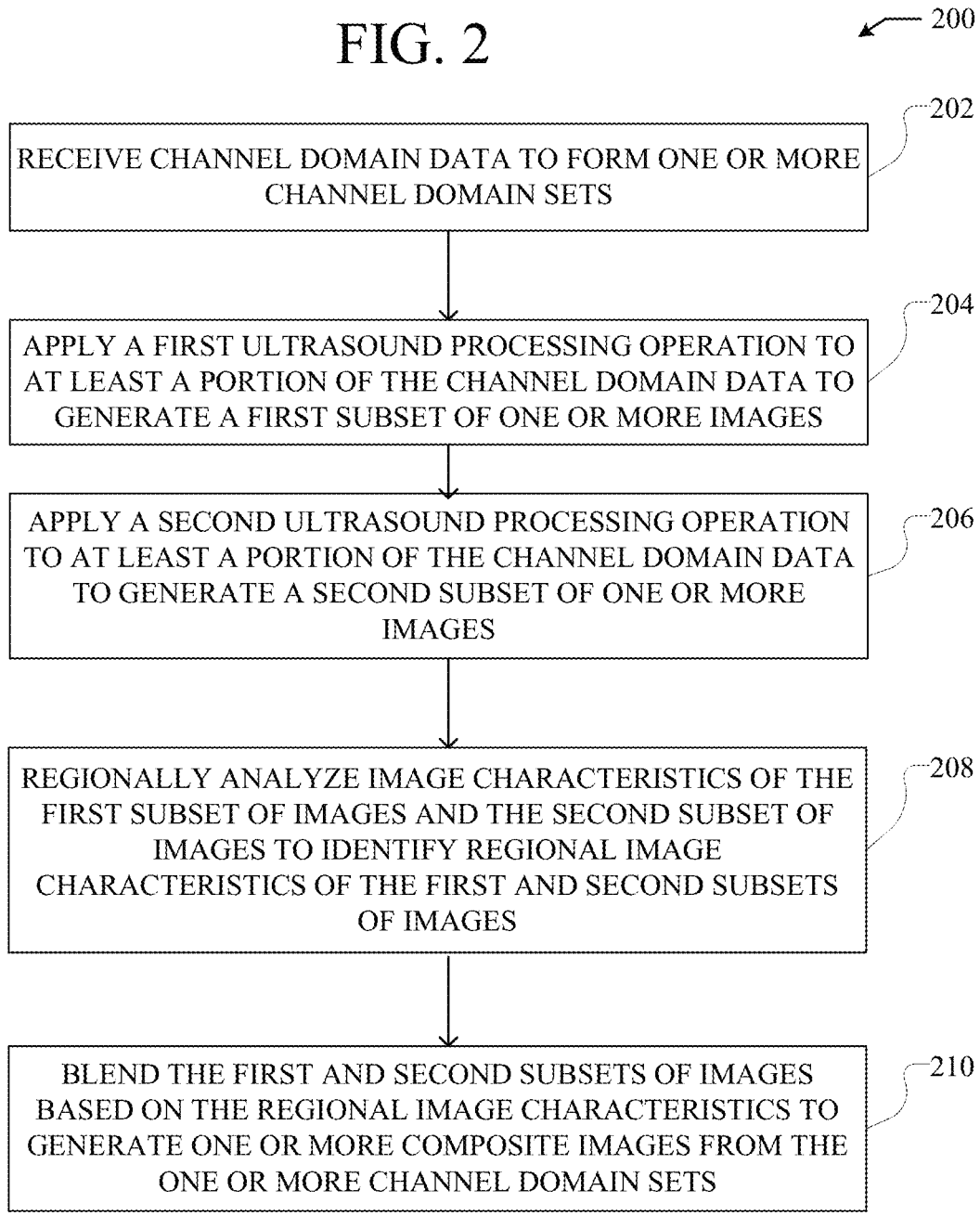
FIG. 2 is a flowchart of an example method of performing adaptive weighting for adaptive ultrasound imaging.

FIG. 2 is a flowchart 200 of an example method of performing adaptive weighting for adaptive ultrasound imaging. The example method shown in FIG. 2, and other methods and techniques for ultrasound imaging described herein, can be performed by an applicable ultrasound imaging system, such as the ultrasound system 100 shown in FIG. 1. For example, the example methods and techniques for ultrasound imaging described herein can be performed by a main processing console of an ultrasound system.

At step 202, channel domain data is received from an ultrasound transducer to form one or more channel domain sets. Channel domain data can be received from an applicable ultrasound transducer, such as the ultrasound transducer 110 shown in FIG. 1. Further, channel domain data can be received wirelessly from a wireless ultrasound transducer that is wireless coupled to a main processing console of an ultrasound system.

Channel domain data, as used herein, includes data generated from each transducer element and from every transmit/receive cycle that is used to produce an ultrasound image. For example, in a 128-channel system that is using a single focus zone and sampling to a depth of 16 cm in a curved array format there might be around 192 transmit receive cycles. Channel domain data can include data that is used to generate an ultrasound image before any processing is done on the data. For example, channel domain data can include data that is generated by an ultrasound transducer before the data is pre-processed for beamforming, before beamforming actually occurs, and/or before the data is post-processed after beamforming to generate an ultrasound image.

In various embodiments, the channel domain data can be stored at an analog-to-digital converter sample rate. Alternatively, the channel domain data can be converted to baseband data and resampled at the Nyquist rate. Specifically, a typical bandwidth of a curved transducer is around 5 MHz and the typical sample rate of a modern ultrasound system is around 50 MHz at 14 bits. This would result in a single data frame of around 500 MB if sampled at the full data rate or 125 MB if down sampled to the Nyquist rate for a single image set of channel domain data. The Nyquist number can remain constant or within a specific narrow range across transducers of various frequencies, as the bandwidth of the transducer signal decreases when the imaging depth increases. Typical ultrasound imaging systems run at a frame rate of around 30 Hz. As a result, a system bandwidth can be 15 GB/sec for full sampled data or 3.75 GB/sec for Nyquist sampled data.

In conventional ultrasound systems, the previously described high bandwidth requirements force the systems to process channel domain data extremely quickly. Further, the high bandwidth requirements force the systems to discard the channel domain data after processing the data to make room for the next channel domain data set. With advancements in processing power, in particular Graphics Processing Units (GPUs), the techniques and methods described herein can be realized. Specifically, advances in processing power of ultrasound imaging systems allow for the processing of channel domain data multiple times, e.g. in a time window between ultrasound image frames. Further, advances in processing power allow for application of different ultrasound processing operations on the same channel domain data, e.g. in a time window between ultrasound image frames. For example, a single frame of data might consist of a grid of 256 by 1024 points or 256 k points. A very simple reconstruction algorithm can require an interpretation, phase rotation and scaling and then a sum. For a 128-channel system, this results in around 1500 arithmetic operations per point or 375 Mbps/frame. Given that the system would need to process this data around 3 to 6 different ways, e.g. using different ultrasound processing operations, for each frame data, there might be 2 or 3 different frame data sets running at 30 frames per second. In turn, processing according to these specifications can require computational capabilities well within the capabilities of modern GPUs.

At step 204, a first ultrasound processing operation is applied to at least a portion of the channel domain data to generate a first subset of one or more images. Ultrasound processing operations, as used herein, can include applicable operations applied to channel domain data for purposes of generating one or more ultrasound images. Specifically, ultrasound processing operations can include applicable operations applied to channel domain data before post-beamformed data processing is applied to generate one or more ultrasound images. More specifically, ultrasound processing operation can include data operations applied to generate beamformed data from channel domain data, which can subsequently be post-processed to form one or more ultrasound images. Additionally, an ultrasound processing operation, as described herein, can include a plurality of sub-operations. Specifically, an ultrasound processing operation can include a plurality of operations that are applied to the channel domain data to process the data according the ultrasound processing operation. For example, an ultrasound processing operation can include both minimum variance operations and phase coherence operations applied to the channel domain data as part of an overall ultrasound processing operation.

An ultrasound processing operation can be applied to all of the channel domain data. Specifically, an ultrasound processing operation can be applied to all channel domain sets in the channel domain data. For example, a beamforming operation can be applied, potentially multiple times, to all channel domain sets in the channel domain data. Alternatively, an ultrasound processing operation can be applied to only a portion of the channel domain data. Specifically, an ultrasound processing operation can be applied to a subset of all channel domain sets in the channel domain data. For example, a beamforming operation can be applied, potentially multiple times, to a subset of all channel domain sets in the channel domain data.

As discussed previously, an ultrasound processing operation can include an operation for beamforming the channel domain data. Specifically, an ultrasound processing operation can include a beamforming operation for creating beamformed data ultimately from the channel domain data. For example, an ultrasound processing operation can be a coherent beamforming operation, a digital beamforming operation, a synthetic aperture beamforming operation, or an adaptive beamforming operation.

Additionally, an ultrasound processing operation can include variables that modify the ultrasound processing operation when it is applied. Specifically, a beamforming operation can include one or more variables that can be adjusted to modify the beamforming operation applied to channel domain data. This effectively creates two separate ultrasound processing operations that can be applied to the channel domain data to create different images from the channel domain data. The variables can be applicable operational variables for modifying an ultrasound processing operation, e.g. a beamforming operation.

In various embodiments where an ultrasound processing operation is a digital beamforming operation, either or both a variable aperture size and a variable window function can be modified. Specifically, a variable aperture size and/or a variable window function can be modified to apply different digital beamforming operations to the channel domain data to create different subsets of one or more images, e.g. as part of applying different ultrasound processing operations to the channel domain data. For example, either or both an aperture size and a window function of a digital beamforming operation can be modified to ultimately observe the tradeoffs between cluster and resolution in one or more resultant images.

In various embodiments where an ultrasound processing operation is a synthetic aperture beamforming operation, one or a combination of variable coherent combination coefficients, variable coherent transmit coefficients, variable characteristics of a transmit profile, variable characteristics of a receive aperture can be modified. Specifically, one or a combination of variable coherent combination coefficients, variable coherent transmit coefficients, variable characteristics of a transmit profile, variable characteristics of a receive aperture can be modified to apply different synthetic aperture beamforming operations to the channel domain data to create different subsets of one or more images. For example, variable coherent transmit coefficients can be adjusted in order to suppress one or more side-lobes of a transmit profile created through application of a synthetic beamforming operation. In another example, values of variable characteristics of a receive aperture in applying a synthetic aperture beamforming operation can be adjusted to form a Gaussian two-way point spread function at points in a field of view of the receive aperture. In another example, the above-mentioned parameters can be modified to optimize one or a combination of resolution, signal-to-noise ratio (SNR), uniformity, and/or clutter in one or more resultant images created through application of a synthetic beamforming operation.

In various embodiments where an ultrasound processing operation is an adaptive beamforming operation, either or both a minimum variance and a variable phase coherence can be modified. Specifically, a minimum variance and/or a variable phase coherence can be modified to apply different adaptive beamforming operations to the channel domain data to create different subsets of one or more images, e.g. as part of applying different ultrasound processing operations to the channel domain data. For example, either or both a minimum variance and/or a variable phase coherence can be modified to optimize one or a combination of resolution, SNR, uniformity, and/or clutter in one or more resultant images created through application of an adaptive beamforming operation.

An ultrasound processing operation to apply to the channel domain data can be selected based on operational characteristics of a performed ultrasound procedure. Operational characteristics of a performed ultrasound procedure can include one or a combination of characteristics of a patient subjected to the ultrasound procedure, a type of tissue being imaged in the ultrasound procedure, a mode in which the ultrasound procedure is being performed, and other applicable operational characteristics of the ultrasound procedure. For example, an ultrasound processing operation to apply to the channel domain data can be selected based on a data type of the channel domain data. Additionally, an ultrasound procedure operation to apply to the channel domain data can be selected based on user/operator input. For example, an operator can specify to beam form channel domain data using a synthetic aperture beamformer, and subsequently, a synthetic aperture beamforming operation can be applied to the channel domain data.

At step 206, a second ultrasound processing operation is applied to at least a portion of the channel domain data to generate a second subset of one or more images. The second ultrasound processing operation can be applied to the same channel domain data that the first ultrasound processing operation was applied to at step 204. For example, if the first ultrasound processing operation was applied to all of the channel domain data, then the second ultrasound processing operation can be applied to all of the channel domain data as well. In another example, if the first ultrasound processing operation was applied to a specific channel domain set, then the second ultrasound processing operation can be applied to the specific channel domain set. Alternatively, the second ultrasound processing operation can be applied to different channel domain data from the channel domain data that the first ultrasound operation was applied to at step 204. For example, if the first ultrasound operation was applied to a first channel domain set, then the second ultrasound operation can be applied to a second channel domain set different from the first channel domain set.

The second ultrasound processing operation can be the same ultrasound operation as the first ultrasound processing operation applied to the channel domain data at step 204. For example, the second ultrasound processing operation can be the same coherent beamforming operation applied to the channel domain data at step 204. Alternatively, the second ultrasound processing operation can be a different ultrasound operation from the first ultrasound processing operation applied to the channel domain data at step 204. For example, both the first and second ultrasound processing operations can be a digital beamforming operation with an adjusted window function that is applied to the channel domain data. In another example, the first ultrasound processing operation can be a first beamforming operation and the second ultrasound processing operation can be a different beamforming operation from the first beamforming operation. For example, the first ultrasound processing operation can be a coherent beamforming operation and the second ultrasound processing operation can be a digital beamforming operation.

In a traditional ultrasound system transmit profiles are generated and amplified by the transmit generator. The waves than pass through a transmit/receive switch that diverts the energy to the transducer where the electrical energy can be converted to acoustic waves to produce an acoustic signal that can propagate through the tissue under investigation. These acoustic waves are reflected back to the transducer where their acoustic energy is converted back to an electrical signal that passes through the transmit/receive switch and this electrical energy is than directed to a the receive stage of the system where it is amplified and adjusted for gain over depth in the analog domain prior to being converted to a digital representation of the analog signal. At this point the digital signal is buffered. The signals are than processed in the channel domain to precondition them for the image formation step. Several steps can occur in the channel domain. For example, the signals can be converted to baseband, compensated for limitations of the analog gain stage vs depth, compensated for the greater attenuation of higher frequency components via a downshift tracking filter or a depth dependent spectral equalizer, and the like. This is also a stage where the data can be coherently averaged to build up an improved signal to noise ratio or extract harmonic components and the like, and when done it is buffered again. This buffer can pass the data to the image formation process where depending on the type of channel domain data various processing schemes can be used for example if it was a synthetic aperture based data from convergent transmit waves the basic processing could be to form an image optimized for signal to noise, detail resolution, contrast resolution, minimized clutter along with these same optimization schemes but forming the image for a steered perspective. As shown above, this data can be processed multiple times by applying the first ultrasound processing operation and the second ultrasound processing operation while the data is kept in a buffer. While the technique is described with respect to only two ultrasound processing operations, in various embodiments, more than two ultrasound processing operations can be applied to the channel domain data. For example, the channel domain data can be processed 12 times to form 12 images all optimized with different goals, e.g. created through application of different ultrasound processing operations. This can be repeated if there are additional channel domain data sets in the buffer to create additional images.

The value of retaining the channel domain data set(s) so that it can be processed under different optimization strategies, e.g. using different ultrasound processing operations, as described in steps 204 and 206, solves the previously mentioned deficiencies of current ultrasound systems. For example, images can be created to enhance or otherwise improve specific aspects of ultrasound images in order to generate the highest quality ultrasound images based on characteristics of a performed ultrasound process. This in conjunction with the advances in the processing power, e.g. with the flexibility of the GPUs, makes it feasible to process sets of channel domain data multiple times under a variety of optimization strategies, e.g. in a real-time manner.

Additionally, a number of the techniques can be run multiple times under the same optimization strategy, but by using the channel domain data set, a virtual steering of the transmit and receive profiles can be constructed. For example, different ultrasound processing operations can be applied using a synthetic aperture image formation method focused on maximizing detail resolution in a set of images by utilizing different transmit/receive angles. These images can have similar detail resolution, but their clutter can be uncorrelated so that when compounded, the resulting composite image would have reduced variance in the speckle and hence improved contrast resolution.

The disclosure now turns to forming composite images from the subsets of images created at steps 204 and 206. Specifically, after creation at steps 204 and 206, each image can be regionally analyzed to identify image characteristics such as detail resolution, contrast resolution, signal to noise as well as a variety of other merits in a reginal basis so that a composite image can be constructed to produce a final compounded image that represents the strengths of the initial image set while minimizing the weaknesses.

At step 208, the first subset of one or more images and the second subset of one or more images are regionally analyzed to identify regional image characteristics of the first subset of one or more images and the second subset of one or more images. In regionally analyzing the first and second subsets of one or more images, portions of the one or more images can be analyzed to identify regional image characteristics for each portion of the one or more images. For example, data corresponding to a top corner of an image can be analyzed to identify image characteristics of the top corner of the image, thereby corresponding to regional image characteristics of the image. Image characteristics and corresponding regional image characteristics of an image can include applicable characteristics of an ultrasound image. For example image characteristics and corresponding regional image characteristics can include one or a combination of noise clutter level, detail resolution, contrast resolution, temporal resolution, spatial resolution, penetration, and mean variance.

In various embodiments, before the first subset of one or more images and the second subset of one or more images are regionally analyzed, the first and second subsets of one or more images can be coherently processed. As will be discussed in greater detail later, coherent processing of the first and second subsets of one or more images can include performing non-linear signal extraction on the images. Further, as will be discussed in greater detail later, coherent processing of the first and second subset of one or more images can include performing synthetic aperture filtering on the images.

At step 210, the first and second subsets of one or more images are blended to generate one or more composite images from the one or more channel domain sets. Specifically, the first and second subsets of one or more images can be blended based on the regional images characteristics of the images in the first and second subsets to generate one or more composite ultrasound images. More specifically, as regions within the images overlap, the overlapping portions of the regions can be combined based on the regional image characteristics in order to create smooth transitions between the regions in a resultant composite image. For example, differences in temporal resolution between different regions can be reduced gradually in overlapping portions of the regions in order to create smooth transitions between the regions in resultant composite images. After the one or more composite images are created by blending the first and second subsets of images, the one or more composite images can be displayed, e.g. to a user or operator of an ultrasound system. Further, after the one or more composite images are created by blending the first and second subsets of one or more images, the composite images can be further processed according to applicable backend/post-processing techniques. For example, the composite images can be filtered, potentially adaptively, and scan converted for display as part of backend processing the composite images.

The one or more images in first and second subsets of images can be blended using an applicable adaptive combination technique. For example, the subsets of one or more images can be combined using minimum value combination, maximum value combination, geometric average combination, arithmetic averaged combination, majority voting image combination, and weighted voting image combination. Further, the one or more images in the first and second subsets of images can be blended using a weighting function. Specifically, as will be discussed in greater detail later, the regional image characteristics of the images in the first and second subsets of one or more images can be used as an input to a weighting function. The weighting function can then be applied to the images to adaptively blend the images into one or more composite images that represent a regional based optimization of the desired imaging attributes, e.g. the different ultrasound processing operations applied to create the images.

While the images of the first and second subsets of images are described as being combined in a non-coherent manner, in various embodiments, the images in the first and second subsets of images can be blended in a coherent manner or in a combination coherent and non-coherent manner. For example, in various embodiments, the images in the first and second subsets can be blended absent the regional image characteristics of the first and second subsets of one or more images.

Additionally, while the techniques described herein, including the method shown in FIG. 2, are discussed with reference to B-Mode imaging, in various embodiments the techniques described herein can be used ion other imaging modalities like CEUS, CD-Mode, 3D/4D, and the like.

Figure 3:
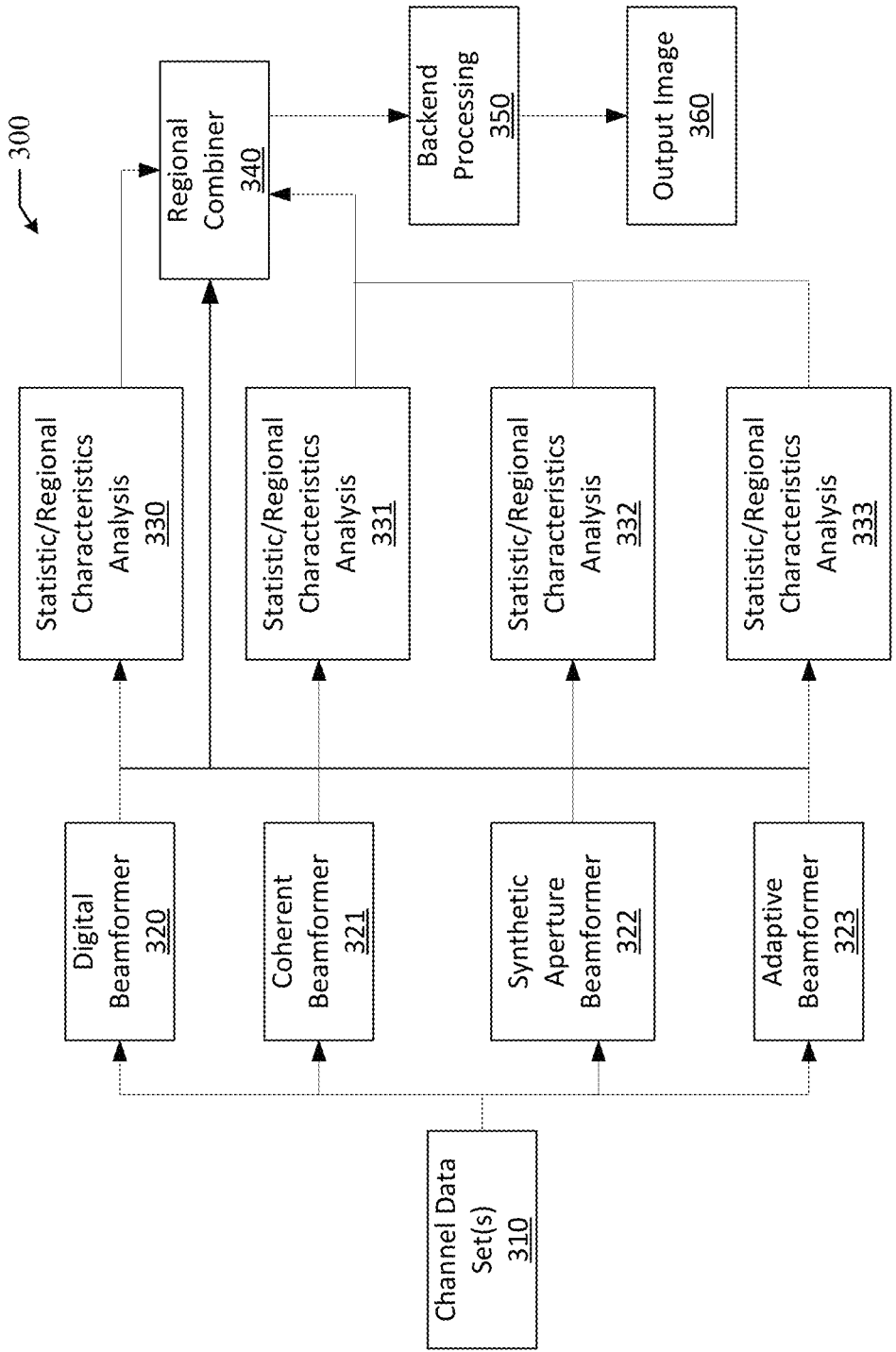
FIG. 3 shows an example flow diagram of an adaptive image formation technique using stages in an adaptive image weighting compounding technique.

FIG. 3 shows an example flow diagram 300 of an adaptive image formation technique using stages in an adaptive image weighting compounding technique. The flow diagram 300 depicts the various image formation techniques that can be used on one or more sets of channel data.

The input to the flow diagram 300 starts with the channel data set(s) 310. The channel data set(s) 310 can include data from one transducer element, a subset of total transducer elements, or all transducer elements. Specifically, the channel data sets(s) 310 can include data from a number of transducer elements depending on an ultrasound system and/or every transmit/receive cycle used to cover a desired field of view. It should be noted that it is not a limitation that an entire set must be collected prior to processing, however in various embodiments, in order to generate the required data to cover a full field of view, an entire sequence of transmit/receive cycles covering the entire field of view can be received.

Depending on data transmit characteristics, several image formation processing techniques can be used. For example, if a convergent wave, focused transmit beam, data set is collected then each of the image formation strategies, different flow paths in the flow diagram 300, can be used. For example, the digital beamformer 320 can perform a sum and dump image formation technique. Specifically, several different receive apertures can be used to generate multiple subsets of one or more images.

As for the coherent beamformer 321, a dual line image formation strategy can be used. Specifically, for transmit/receive cycles two vectors can be constructed. The vectors can include a single vector overlap from each adjacent transmit/receive cycle. The vectors can be spatially coincident such that two vectors can be averaged to improve the overall SNR as well as the point spread function. In various embodiments, a plurality of images can also be generated using this technique by either or both varying characteristics of the receive aperture and varying the number of coherent lines that overlap.

For the synthetic aperture beamformer 322, the channel data set(s) 310 can be processed under a variety of image formation strategies. For example, operational characteristics of the synthetic aperture beamformer 322 can be adjusted to increase SNR, decrease clutter, increase detail resolution, increase contrast resolution. Specifically, variable coherent combination coefficients, variable coherent transmit coefficients, variable characteristics of a transmit profile, and variable characteristics of a receive aperture can be adjusted when applying the synthetic aperture beamformer 322 to achieve the previously described improvements in images. Further, the channel data set(s) 310 can be synthetically steered and re-optimized under the previous strategies in each new direction.

As for the adaptive beamformer 323, the channel data set(s) 310 can be processed in a variety of ways. For example, minimum variance can be adjusted when applying the adaptive beamformer 323 to generate one or more images, e.g. potentially different subsets of images. In another example, phase coherence can be adjusted when applying the adaptive beamformer 323 to generate one or more images, e.g. potentially different subsets of images.

In various embodiments, an applicable combination of the digital beamformer 320, the coherent beamformer 321, the synthetic aperture beamformer 322, and the adaptive beamformer 323 can be applied to the channel data set(s) to generate one or more subsets of one or more images. Further, in various embodiments, any of the digital beamformer 320, the coherent beamformer 321, the synthetic aperture beamformer 322, and the adaptive beamformer 323 can be applied to the channel data set(s) 310 multiple times. For example, a number of synthetic aperture beamformer 322 coherence combinations can be applied to further refine images generated through application of the adaptive beamformer 323.

Each of the images produced by the beamforming techniques are than regionally analyzed to extract a set of statistical parameters and regional image characteristics. The regional image characteristics and statistical parameters can be used by the regional combiner 340 to ultimately generate one or more composite output images. Specifically, the statistic/regional characteristics analysis module 330 coupled to the digital beamformer 320 can break each image into a grid that is overlapping or disjoint. For each region of the grid, the statistic/regional characteristics analysis unit 330 can analyze the data in a variety of ways. For example, the statistic/regional characteristics analysis module 330 can identify image characteristics such as variance, mean, max, min, clutter, speckle, boundary, and the like for each region. This type of analysis can be identical for the other statistic/regional characteristics analysis modules 331, 332, and 333.

The information from the statistic/regional characteristics analysis modules 330, 331, 332, and 333, in conjunction with the image data sets from the beamformers 320, 321, 322, 323, is than passed to the regional combiner 340. The regional combiner 340 can analyze the image data sets region by region. Specifically, the regional combiner 340 can use the statistic/regional image characteristics for each image to adaptively combine the regions under a variety of strategies based on regional image characteristics. For example, the regional combiner 340 can combine regions based on max, min, arithmetic mean, geometric mean, adaptive weight, and the like.

The output, e.g. one or more blended composite images, of the regional combiner 340, is than processed through the backend processing 350. The backend processing can transform the adaptively compounded image for output display as an output image 360.

Figure 4:
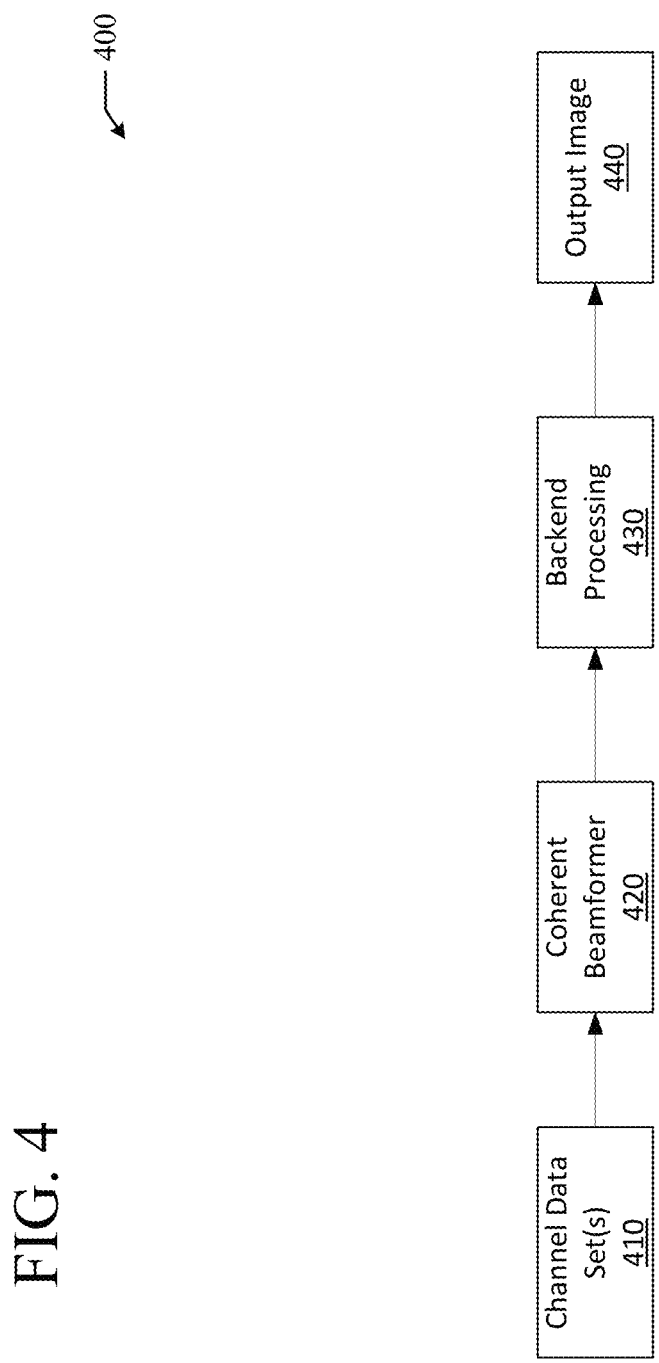
FIG. 4 shows a flow diagram of an image formation technique using coherent beamforming.

FIG. 4 shows a flow diagram 400 of an image formation technique using coherent beamforming. As data from the transmit/receive cycles are fed into the channel data set 410, the data is passed to the coherent beamformer 420. The coherent beamformer 420 can construct a minimum of 2 adjacent vectors from each transmit/receive channel data set 410. As the next channel data set 410 is passed to the coherent beamformer 420, the coherent beamformer 420 can construct at least two spatially non-coincident vectors. While the vectors are spatially non-coincident, at least one the vectors can be spatially coincident with a vector of the previous set. The spatially coincident vectors across two sets are then summed. This can improve the overall image quality of one or more images created by the beamformer 420. Once the entire field of view has been covered the image from the coherent beamformer 420, the data of one or more images created by the beamformer 420 is then passed to a backend processing module 430. The backend processing module 430 can further process the one or more images so that the images are formatted for output display as one or more output images 440. In traditional ultrasound systems there is not a way to adaptively combine images that have been processed under a variety of constraints. There is however the capability to combine images from various steering angles of different channel data sets to form a compound image but these are processed under a single optimization strategy and they come from different channel data sets.

Figure 5:
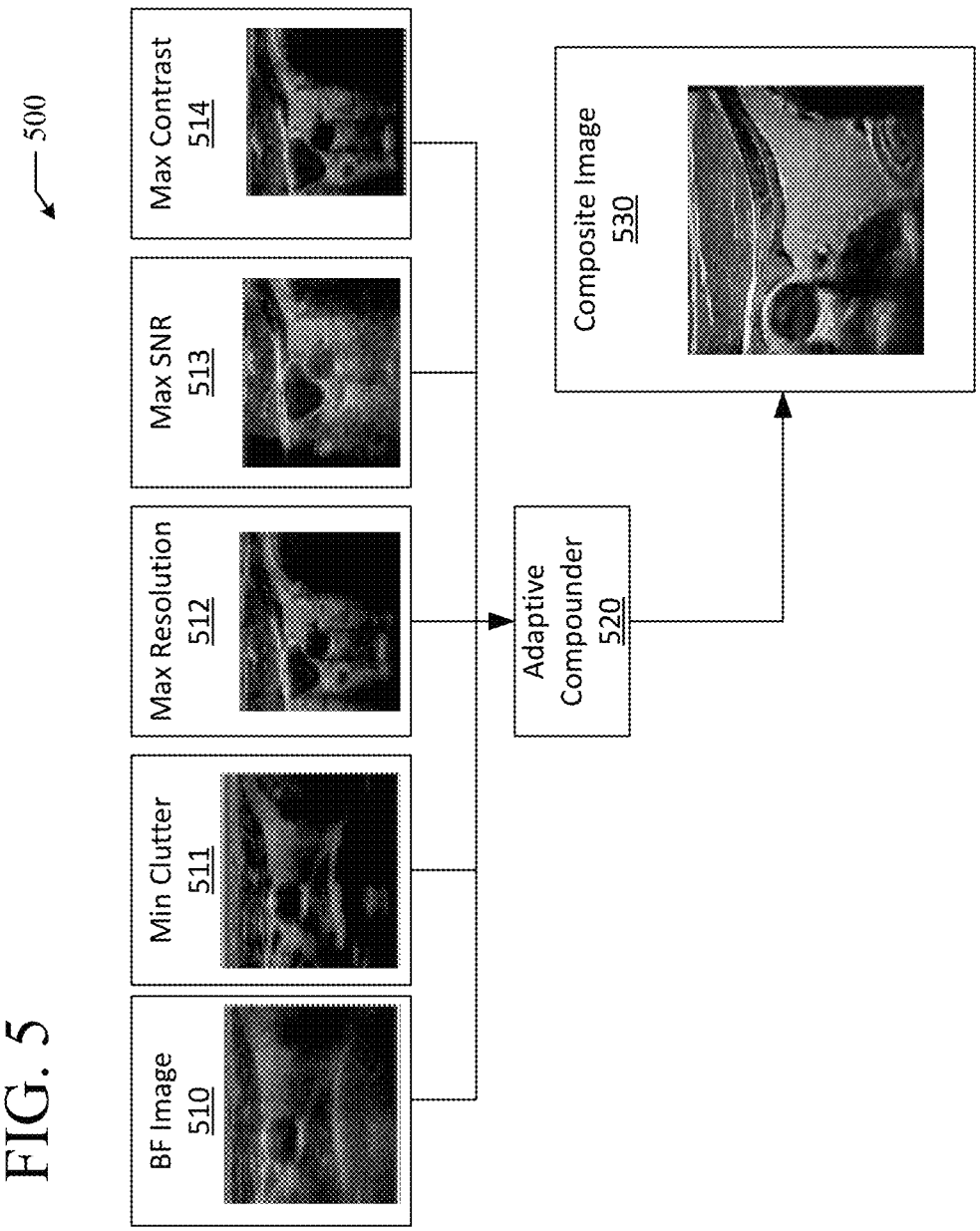
FIG. 5 shows a flow diagram of an example of a technique for combining images using an adaptive combiner structure.

FIG. 5 shows a flow diagram 500 of an example of a technique for combining images using an adaptive combiner structure. The flow diagram 500 includes a corresponding set of images that have been optimized for various performance attributes, e.g. different applied ultrasound processing operations, using the adaptive combiner structure.

In this particular example, the images include a standard beamformed image 510 that is based on a traditional delay, sum, and amplitude weighting method. This image has a nice balance between contrast resolution, detail resolution, clutter, and penetration.

The second image 511 has been formed to decrease clutter. There are several techniques that can be used to create this image. For example, adaptive image ultrasound operation(s) can be performed based on phase coherence.

The third image 512 has been created to increase detail resolution. A technique for constructing this image can include applying a synthetic aperture image formation operation where the receive is set to a low $f^{\#}$.

The fourth image 513 has been created to increase SNR. A technique for generating this image can include applying a synthetic aperture image formation operation where the coherent combination coefficients are selected in a manner that maximally adds the coherent signals.

The final image 514 has been created to increase contrast resolution. A technique for generated this image can include applying a synthetic aperture image formation operation where the coherent transmit coefficients can be selected to suppress the side lobes of the transmit profile. Further, the receive coefficients for applying the synthetic aperture image formation operation can be selected to form a Gaussian like two-way point spread function at all or a portion of points within the field of view.

There are a number of other ultrasound processing operations that could also be selected to add to the input images. For example, each of these current images can be generated from several steered angles. All of the input images are passed to the adaptive compounder 520. The adaptive compounder 520 functions blend the images based on regional image characteristics of the images. Specifically, the adaptive compounder 520 can combine the image in a regional manner based on their regional image attributes as well as their regional statistical properties resulting in an adaptively optimized image/composite image 530. This composite image 530 can be formed to be an image that contains the desired attributes of each of the sub images 510, 511, 512, 513, and 514 without some or all of the deficiencies in the sub images 510, 511, 512, 513, and 514. Specifically, as shown in the flow diagram 500, the composite image 530 can have improved detail resolution, contrast resolution, minimum clutter, and good signal to noise at all or most depths.

Figure 6:
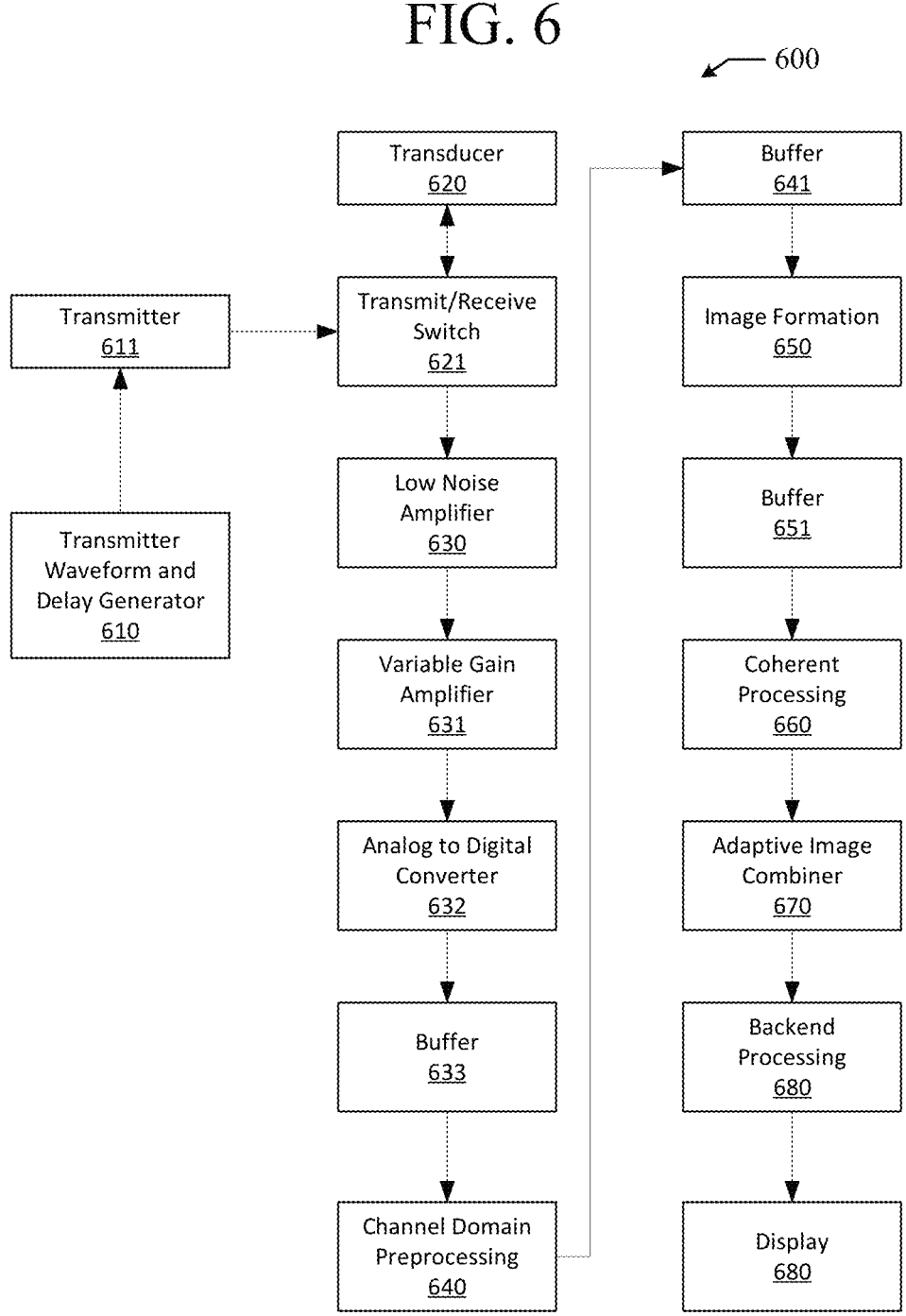
FIG. 6 shows a flow diagram of an ultrasound imaging path that has the architecture to support an adaptive weighted adaptive image processing structure.

FIG. 6 shows a flow diagram 600 of an ultrasound imaging path that has the architecture to support an adaptive weighted adaptive image processing structure. This imaging path is simplified and a number of complex blocks have been condensed into single steps for illustration purposes. As any skilled individual in medical imaging knows there are many system architecture choices that can be used to produce an image and this is just one example.

The transmission of soundwaves into the body starts with the system generating a transmitter waveform and delay generator 610. This step has the ability to determine the aperture, delay profile, windowing function and power of the transmit profile. All of these parameters are potential candidates for modification by the system to optimize performance, e.g. through application of different ultrasound processing operations.

The output of the transmitter waveform and delay generator 610 is connected to the transmitters 611. These transmitters 611 can take the signals from the previous stage and amplify it to a level appropriate to drive the transducer. Output of the transmitters 611 pass through a transmit/receive switch 621. This transmit/receive switch 621 allows the output of the transmitters 611 to be connected to the transducer 620, while preventing it from potentially interfering with or otherwise being sent to the low noise amplifier 630. The waveforms are emitted from the transducer 620 and received by the same transducer 620 after interacting with the tissue. These received signals pass through the transmit/receive switch 621 and are amplified by the low noise amplifier 630. Most systems have several potential gain settings that these low noise amplifiers 630 can operate at based on the desired imaging mode.

The output of the low noise amplifier 630 is than inputted into a variable gain amplifier 631. The variable gain amplifier 631 can amplify the signal at a rate to compensate for attenuation of the signal over time. The rate of this amplification can be programmed. The output of the variable gain amplifier 631 is than received by the analog to digital converter 632, which can convert the signal from an analog waveform to a digital waveform. The analog to digital converter 632 has the ability to adjust sample rate typically. The output of the analog to digital converter 632 is then stored in a buffer 633.

Once the data is stored in the buffer 633, it can then be processed in the channel domain preprocessing module 640. The channel domain preprocessing module 640 can analyze on single transducer element data level of granularity. Further, the channel domain preprocessing module 640 can process the data on a sample by sample basis for gain, frequency, bandwidth, decoding and the like. Additionally, the channel domain preprocessing module 640 can process multiple transmit/receive cycles of data for data averaging, decoding, non-linear processing and the like.

Once the data is processed by the channel domain preprocessing module 640, it is transferred to the buffer 641, where it can be processed by the image formation module 650. The image formation block has the ability to process that data both within as well as across the channels to form an image. Some of the processes might include delay, sum, filter, gain, adaptive processing of these parameters and the like. This image formation module 650 can read the buffer 641 multiple time so that the data can be processed under a number of optimization strategies, e.g. through application of multiple ultrasound processing operations.

Data created by the image formation module 650 is than buffered 651. The data for the buffer 651 is transferred to a coherent processing module 660 where additional processing can be done for non-linear signal extraction, filtering for synthetic aperture processing techniques and the like. The data entering and leaving this block has both phase and magnitude information.

The data from the coherent processing module 660 is than passed to an adaptive image combiner 670. The adaptive image combiner 670 can analyze images from the image formation module 650 on a regional basis to extract both regional image characteristics as well as regional statistical properties for each sub-region of each image. In turn the adaptive image combiner 670 can create an optimized image/composite image based on the regional image characteristics and the regional statistical properties for each image.

Figure 7:
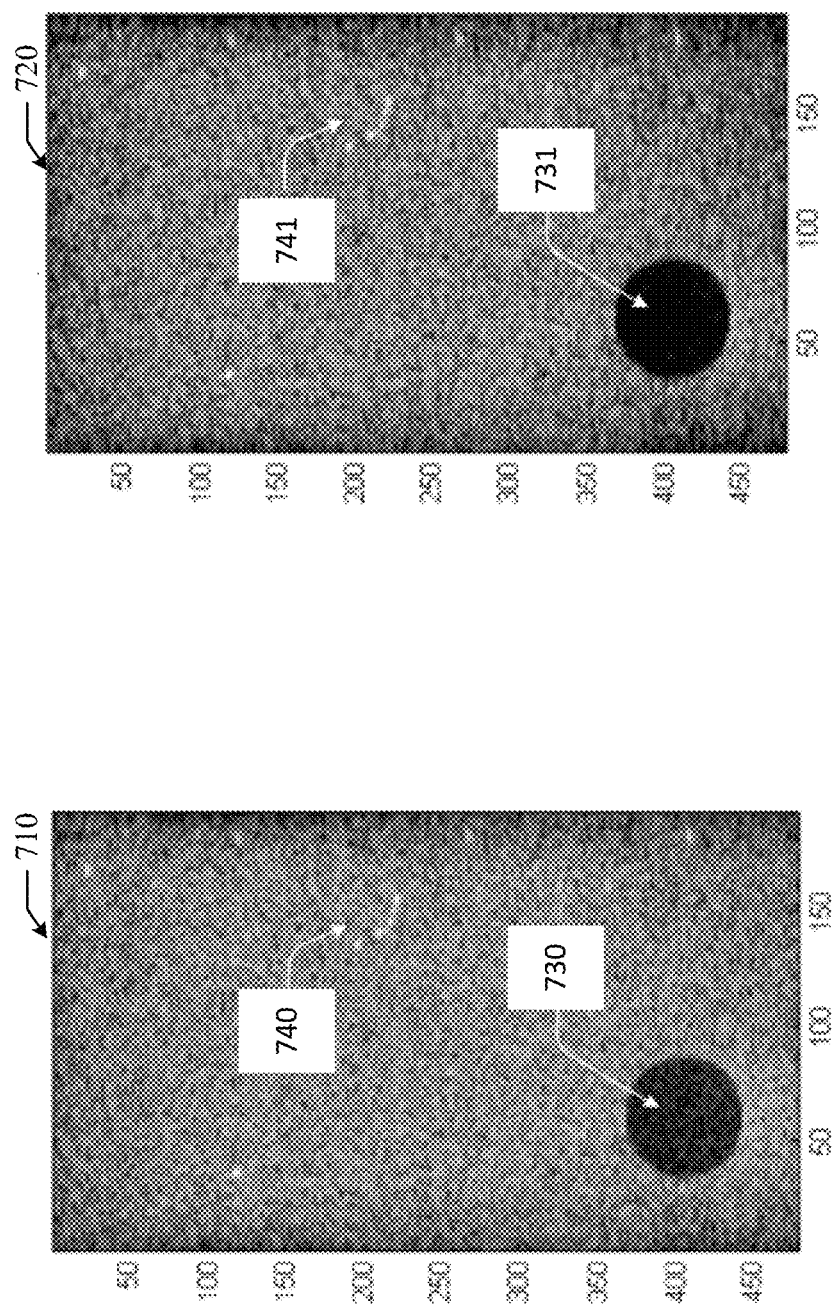
FIG. 7 shows a set of images illustrating application of ultrasound processing operations to decrease clutter.

The output of the adaptive image combiner 670 is than passed to the backend processing module 680. The backend processing module 680 can perform up sampling, down sampling, log compression, detection, spatial filtering, adaptive filtering, scan conversion, and the like, so that that the data can be displayed on the display 680. It should be noted that while a typical B-Mode imaging path has been described, a number of these steps are similar to those required for Harmonic Mode, Contrast Enhanced Ultra-Sound Mode (CEUS), Spatial Compounding, Frequency Compounding and the like. There are also additional modes that contain similar paths but have additional steps like, CD-Mode, PW-Doppler, CW-Doppler, M-Mode, Color M-Mode FIG. 7 shows a set of images illustrating application of ultrasound processing operations to decrease clutter. In this set of images, the right image 710 is an image constructed via a standard beam formation process. The left image 720 is an image processed via an adaptive phase correlation imaging processing technique using multiple ultrasound processing operations from the exact same channel domain data set used to create the right image 710. Both images 710 and 720 include speckle, detail resolution structures and anechoic contrast resolution structures.

The anechoic structures of the images 710 and 720 are identified as elements 730 and 731 respectively. As can be seen in the anechoic structure 730 of image 710, there is a background haze. However, in the anechoic structure 731 of image 720, the haze is decreased or otherwise absent. Also, the ability to clearly resolve the boarders from the speckle to the anechoic structure is more easily done in the right image 720 than the left image 710.

Typically, imaging processing techniques that improve upon the contrast resolution of the image degrade the detail resolution of the image. Fortunately, using the adaptive ultrasound techniques described here, this is not the case as can be seen from the detail resolution targets 540 and 541 respectively. Specifically, it is apparent that there is no loss in detail resolution for the improvement gained in contrast resolution. It should also be noted that the speckle pattern of the two images is not correlated so that if they were combined the overall variance of the speckle would be reduced resulting in improved contrast resolution from a combined image created from the left image 710 and the right image 720.

While the disclosure has been made only with reference to ultrasound systems, the systems and methods for remotely controlling ultrasound systems described herein can be used in conjunction with other applicable medical system. For example, the systems and methods described herein can be used for remote control of biopsy systems, laparoscopic tools, and ablation devices.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method comprising:
   receiving, from an ultrasound transducer, channel domain data to form one or more channel domain data sets;
   applying an ultrasound processing operation to at least a portion of the channel domain data using a first variable that modifies the ultrasound processing operation to generate a first subset of one or more images from the one or more channel domain data sets;
   applying the ultrasound processing operation to at least a portion of the channel domain data using a second variable that modifies the ultrasound processing operation to generate a second subset of one or more images from the one or more channel domain data sets;
   analyzing one or more image characteristics of a first plurality of regions of the first subset of one or more images and a second plurality of regions of the second subset of one or more images; and
   generating one or more composite images from the one or more channel domain data sets by blending regions of the first plurality of regions and the second plurality of regions that optimize the one or more image characteristics, wherein the first variable and second variable are different and include different coherent combination coefficients or different coherent transmit coefficients.

2. The method of claim 1, wherein values of the coherent transmit coefficients are selected to suppress one or more side-lobes of the transmit profile.

3. The method of claim 1, wherein the one or more image characteristics include one or a combination of noise clutter level, detail resolution, contrast resolution, temporal resolution, spatial resolution, penetration, and mean variance.

4. The method of claim 1, further comprising coherently processing the first subset of one or more images and the second subset of one or more images before analyzing the one or more image characteristics of the first plurality of regions of the first subset of one or more images and the second plurality of regions of the second subset of one or more images.

5. The method of claim 4, wherein coherently processing the first subset of one or more images and the second subset of one or more images comprises either or both non-linear signal extraction and synthetic aperture filtering.

6. The method of claim 1, further comprising:
backend processing the one or more composite images to generate one or more backend processed composite images; and
displaying the one or more backend processed composite images on a display.

7. A system for performing ultrasound imaging comprising:
one or more processors; and
a computer-readable medium providing instructions accessible to the one or more processors to cause the one or more processors to perform operations comprising:
receiving, from an ultrasound transducer, channel domain data to form one or more channel domain data sets;
applying an ultrasound processing operation to at least a portion of the channel domain data using a first variable that modifies the ultrasound processing operation to generate a first subset of one or more images from the one or more channel domain data sets;
applying the ultrasound processing operation to at least a portion of the channel domain data using a second variable that modifies the ultrasound processing operation to generate a second subset of one or more images from the one or more channel domain data sets;
analyzing one or more image characteristics of a first plurality of regions of the first subset of one or more images and a second plurality of regions of the second subset of one or more images; and
generating one or more composite images from the one or more channel domain data sets by blending regions of the first plurality of regions and the second plurality of regions that optimize the one or more image characteristics, wherein the first variable and second variable are different and include different coherent combination coefficients or different coherent transmit coefficients.

8. The system of claim 7, wherein values of the coherent transmit coefficients are selected to suppress one or more side-lobes of the transmit profile.

9. The system of claim 7, wherein the one or more image characteristics include one or a combination of noise clutter level, detail resolution, contrast resolution, temporal resolution, spatial resolution, penetration, and mean variance.

10. The system of claim 7, wherein the operations further comprise:
coherently processing the first subset of one or more images and the second subset of one or more images before analyzing the one or more image characteristics of the first plurality of regions of the first subset of one or more images and the second plurality of regions of the second subset of one or more images.

11. The system of claim 10, wherein coherently processing the first subset of one or more images and the second subset of one or more images comprises either or both non-linear signal extraction and synthetic aperture filtering.

12. The system of claim 7, wherein the operations further comprise:
backend processing the one or more composite images to generate one or more backend processed composite images; and
displaying the one or more backend processed composite images on a display.

* * * * *